United States Patent [19]
Klein

[11] Patent Number: 5,090,262
[45] Date of Patent: Feb. 25, 1992

[54] LEVER-TYPE TRANSMISSION GEAR

[75] Inventor: Hans-Christof Klein, Hattersheim, Fed. Rep. of Germany

[73] Assignee: Alfred Teves GmbH, Frankfurt, Fed. Rep. of Germany

[21] Appl. No.: 734,026

[22] Filed: Jul. 22, 1991

Related U.S. Application Data

[63] Continuation of Ser. No. 202,757, Jun. 3, 1988, abandoned.

[30] Foreign Application Priority Data

Jun. 5, 1987 [DE] Fed. Rep. of Germany ....... 3718944

[51] Int. Cl.$^5$ .................... F16H 21/16; G05G 7/04
[52] U.S. Cl. ........................ 74/110; 74/107; 74/516; 74/518
[58] Field of Search ............... 74/99 A, 107, 110, 516, 74/518

[56] References Cited
U.S. PATENT DOCUMENTS

| | | | |
|---|---|---|---|
| 2,448,245 | 8/1948 | Bakewell | 74/518 |
| 2,470,452 | 5/1949 | Ackley | 74/110 |
| 2,693,708 | 11/1954 | Baer, Sr. et al. | 74/110 |
| 3,738,184 | 6/1973 | Matthey et al. | 74/110 |
| 4,385,528 | 5/1983 | Pauwels | 74/518 |

*Primary Examiner*—Allan D. Hermann
*Attorney, Agent, or Firm*—Robert P. Seitter; J. Gordon Lewis

[57] ABSTRACT

The disclosed lever-type gear works on a variable transmission ratio, with the degree of transmission being respectively dependent on the position of the levers and the position of the roller element between the levers. According to a preferred arrangement, the gear can be so designed as to provide a state of indifferent equilibrium once a force $F_P$ is applied to the associated lever by a rod located on the driving side, which force $F_P$ changes along with the stroke $s_p$ of the rod while a constant force is applied to rod applying force to the other lever, irrespective of the stroke $s_M$ thereof.

17 Claims, 11 Drawing Sheets

LEVER-TYPE TRANSMISSION GEAR

This application is a continuation of application Ser. No. 07/202,757 filed June 3, 1988.

BACKGROUND OF THE INVENTION

The present invention relates to a lever-type transmission gear comprising a pair of coupled levers pivotable about spaced-apart axes extending approximately in parallel, and exhibiting a ratio between a driving and a driven side of the gear which is dependent on the position of the pair of levers.

A transmission gear of this type may comprise, for example, two levers connected in toggle-type manner, wherein the driving and driven elements may be formed of rods movable in a direction transverse with respect to one another. The rods are hinged to the toggle and, to a lever end remote therefrom and movable in the direction of the connecting straight line of the lever bearings remote from the toggle, or in a direction transverse thereto. The transmission ratio between driving and driven sides varies in response to the relative position of the levers, that is, in response to the angle formed by the levers in the area of their toggle-type connection. However, the design of this type of transmission gear offers only limited capabilities of variation of the position-dependent change in the transmission ratio through structural modification.

SUMMARY OF THE INVENTION

It is, therefore, an object of the present invention to provide a lever-type transmission gear exhibiting particularly low internal friction and permitting substantial variation of the pattern of the changing ratio dependent on the position of the pair of levers by means of relatively minor structural modification.

In a lever-type transmission gear of the aforedescribed type, this object is achieved in that the two levers apply force to one another by means of a rolller element disposed therebetween and rolling on internal roll-on curves facing one another, along the flanks of the two levers. The roll-on curves, as viewed in the direction of the pivot axes of the levers, at the roller side exhibit a concave curvature such that the roller element tends to take a stable position once the levers are loaded with respect to one another. The present invention recognizes that the concave shaping or curvature of the roll-on curves for conforming to the desired pattern of the transmission ratio dependent on the position of the pair of levers can widely vary. Nevertheless, the roll-on curves can be of a configuration such that the roller member, once the levers are loaded relative to one another, is forced into a stable position wherein any displacement of the roller member in one or in another direction results in the levers tending to give way to the forces loading them against one another. Accordingly, the roller member, with no additional measures and with the levers loaded relative to one another and being in motion, is automatically and reproducibly displaced between the levers.

The position of the roller element relative to the levers, hence, is substantially dependent only on the relative position of the levers loaded against one another and against the roller element, respectively. A coulisse guide, optionally provided, of the roller member, hence, only serves to increase the operating safety of the gear of the present invention; with a proper operation of the gear, even in the absence of a coulisse guide, the roller member will automatically travel along the same path.

A special advantage of the gear of the present invention is its capability to keep driving and driven-sided forces in a state of indifferent equilibrium even if one of the forces, irrespective of the stroke of the corresponding driving or driven members, increases or decreases constantly, and the counter-force on the driving and driven members, along with the stroke thereof, increases or decreases exponentially. Thus, the gear of the present invention is particularly suitable for use with brake pressure modulators of brake skid-controlled brake systems of automotive vehicles. For, as set out in greater detail in the following, a fluid pressure is applied to pistons, plungers or the like serving for the brake-skid responsive regulation of the fluid pressure of the wheel brake cylinders, which exponentially rises and drops with the stroke of pistons, plungers or the like. With a corresponding design of the gear of the present invention, it will be possible to couple, on the one side of the gear, the pistons, plungers or the like, while, on the other side, to couple a non-regulated vacuum actuator or the like, operating as a constant force source such that the exponentially changing forces of the fluid pressure acting on the pistons, plungers or the like, and the constant force of the actuator are permanently in a state of indifferent equilibrium. This, then, enables the pistons, plungers or the like to be adjusted in brake skid-controlled manner by means of insignificant additional forces to overcome the friction of the gear transmission elements or the like only.

To reduce friction, the roller element preferably consists of two coaxial rollers or roller groups rotatable relative to one another, with the roller or rollers of the one group travelling on the roll-on curve or the roll-on curve paths of the one lever and the roller or rollers of the other group travelling on the roll-on curve and on the roll-on curve paths, respectively, of the other lever. It is provided that the rollers of the two groups are of different diameters to enable the roller element to be axially locked in that one roller of larger diameter is guided between two paths for rollers of smaller diameter, or two rollers of larger diameter are guided, in flange-type manner, on either side of a path for a roller of smaller diameter.

The driving and driven elements of the gear, as a rule, are formed by plunger-type rods guided in longitudinally displaceable manner which, with the lever-sided ends thereof or with rollers disposed thereon, on outer curve paths, are in abutment with the lever side facing away from the inner roll-on curves. Generally, an arrangement is preferred in which the rods are disposed with parallel axes.

If, at the same time, it is ensured that the roll-on curves, in the points of contact of the roller element consisting of one or more coaxial rollers (viewed in the direction of the lever pivot axes) have a common normal and that the normal is aligned in parallel to the parallel rod axes, an arrangement giving rise particularly low friction will result.

The friction of the gear can be even further decreased if the swivel bearings of the levers are formed by knife edge bearings. To permit employment of this type of bearings, the driving or driven element applies pressure to the associated lever at a space from the pivot axis thereof. The space is either in excess of the maximum possible space of the roller element from the pivot axis or smaller than the minimum possible space of the roller member from the pivot axis thereby attaining a torque of constant sense of rotation relative to the axis of the roller element is exerted on the respective lever once the same is loaded against the respectively other lever. This is attained in a manner independent of the position of the roller element between the levers. Accordingly, the knife edge bearing may be so provided as to support the respective lever against the afore-mentioned torque. That is, the knife edge portion and the associated receiving portion, through the torque, are forced one against the other.

BRIEF DESCRIPTION OF THE DRAWING

Further objects and advantages of the present invention will be apparent from the following description, reference being had to the accompanying drawing wherein.

DETAILED DESCRIPTION OF A PREFERRED EMBODIMENT

Figure 1:
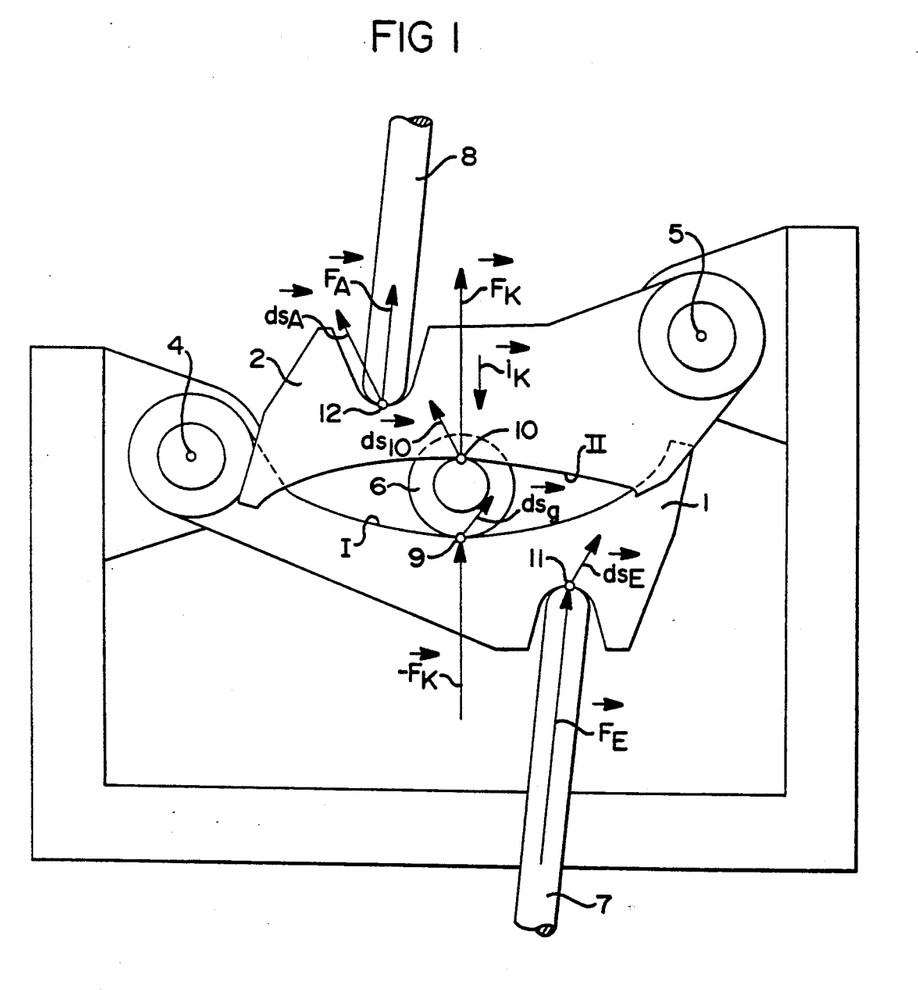
FIG. 1 schematically shows the gear of the present invention, viewed in the direction of the pivot axis of the lever.

Referring now to FIG. 1, levers 1 and 2 with pivot axes 4 and 5 extending in parallel, are rotably located in a frame on opposite frame portions. The free ends of levers 1 and 2, respectively, protrude approximately in the direction of the pivot axis 4 or 5 of the other lever. Lever 2 consists of two parts which, in the view as shown, coincide and are nonrotable relative to one another and are interconnected in fork-type manner, for example, through axis 5 on which lever 2 is located. The space between the coinciding parts of lever 2 is so dimensioned that the lever 1 is able to swing between the parts and that the coinciding parts of the lever 2 can swing laterally past the lever 1, respectively.

Disposed on levers 1 and 2 are roll-on curves I and II on opposite lever sides. Viewed from the direction of the respectively other roll-on curve, each of the roll-on curves I and II exhibits a concave curvature. Travelling on roll-on curves I and II is a roller element 6 comprising coaxially disposed rollers of small or large diameters, with a large-diameter roller travelling on roll-on curve I and with smaller-diameter rollers travelling on the parts and paths, respectively, of roll-on curve II on lever parts of lever 2. The large- and small-diameter rollers can be twisted relative to one another.

Push rods 7 and 8 apply force to levers 1 and 2 on outer points of force application 11 and 12 on the sides of the levers facing away from the roll-on curves I and II such that levers 1 and 2 are forced one against the other and against the roller element 6 disposed therebetween, respectively. The roll-on curves I and II are configured such that roller element 6 is forced into a position wherein the normals of the roll-on curves I and II, in points of contact 9 and 10 coincide between the roll-on curves I and II and the roller element 6. The roller element 6 then occupies a stable position.

Figure 2:
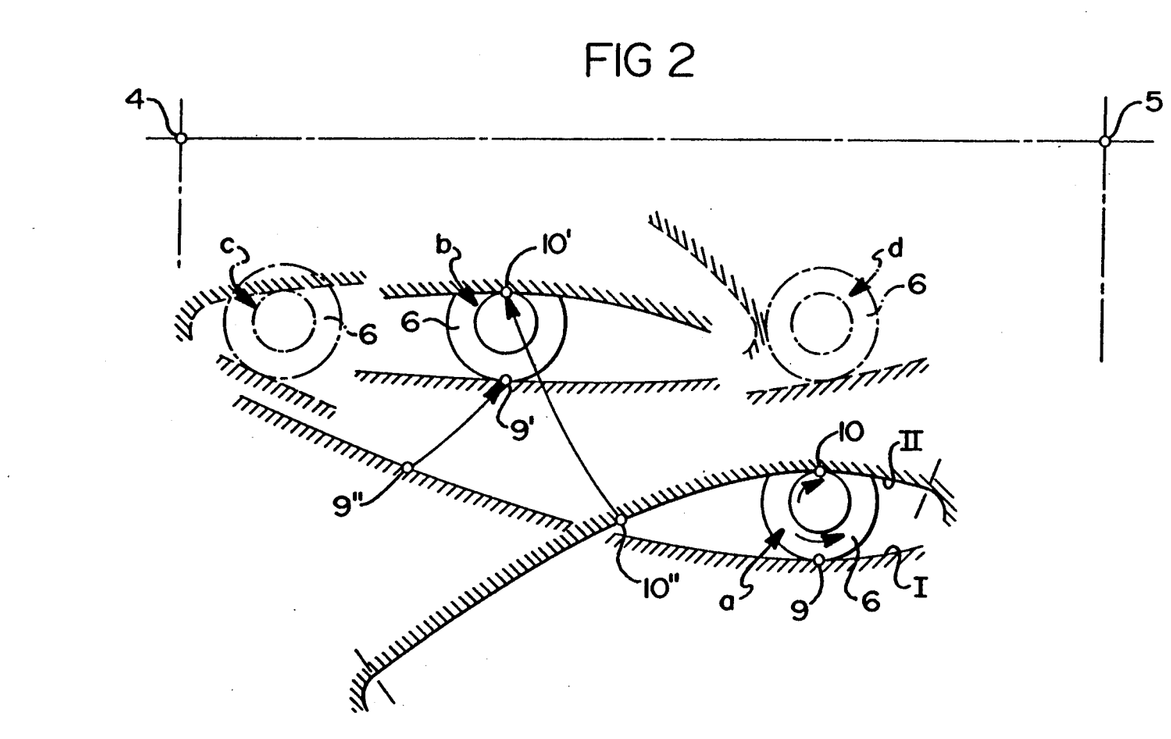
FIG. 2 shows different positions of the roll-on curves disposed on the levers.

FIG. 2 illustrates a variety of typical positions of the roller element 6 with different positions of roll-on curves I and II relative to the axes 4 and 5 of the associated levers 1 and 2 (not shown in FIG. 2). In position a, roller element 6 exhibits a stable position because the normals of the roll-on curves I and II interspersing the points of contact 9 and 10, are coinciding. That is, points of contact 9 and 10 are located in a common axial plane of the roller element 6.

Once roll-on curve I with the associated lever is swivelled in counter-clockwise direction and roll-on curve II with the associated lever is swivelled in clockwise direction about the associated axes 4 and 5 into position b shown in FIG. 2, and the two curves at the same time, by application of corresponding forces, are held in contact with the roller element 6, the roller element 6 on the roll-on curves I and II, automatically rolls to the left thus insuring a stable position b with the points of contact 9' and 10' as shown in FIG. 2. In the afore-mentioned position a, these points of contact 9' and 10' occupy positions 9" and 10", respectively.

FIG. 2 further illustrates an instable position c of the roller elements 6, i.e., the points of contact between roller element 6, on the one hand, and roll-on curves I and II, on the other hand, are not located in a common axial plane of the roller element 6. Once the levers associated to the roll-on curves I and II are forced against one another and against the roller element, respectively, in the example of position c, the same gives way to the right, with the roll-on curves I and II moving toward one another until a stable position of the roller element 6 is reached. Once roll-on curve I and II, respectively, with their associated levers, through outer forces, are forced against the roller element 6, the roller element 6 is substantially unable to take an instable position as shown in position c. The roller member 6, also with roll-on curves I and II in motion, rather tends to take a stable position which is characterized in that the points of contact between the rolling element 6 and the roll-on curves I and II are located in a common axial plane of the rolling element. FIG. 2 also illustrates an impossible position d of the rolling member 6, i.e., the rolling member 6 is located outside one of the two roll-on curves, in the present instance outside the roll-on curve II. In the absence of malfunction of the lever gear such a position cannot be attained.

FIG. 3 again schematically shows the features of a stable position of the rolling element. According to FIG. 3a, the roll-on curves I and II, at the points of contact 9 and 10, comprise normals $N_{Ik}$ and $N_{IIk}$, respectively, falling one into the other. The tangets $T_{Ik}$ and $T_{IIk}$ contacting the roll-on curves I and II at the points of contact 9 and 10, hence, extend in parallel with respect to one another.

In all stable positions of the rolling element, the points of contact 9 and 10 are at a space $\vec{r}_{9-10}$ from one another. The amount of that space is constant. In the example of the lever gear as shown in FIG. 1, the space corresponds to the sum of the radii of the small and large rollers of the rolling elements 6. Differently stable positions of the rolling element 6 are distinguished only by the direction of the space $\vec{r}_{9-10}$. The roll-on curves I and II, at the points of contact 9 and 10, respectively comprise curvatures of opposite signs.

Figure 3A:
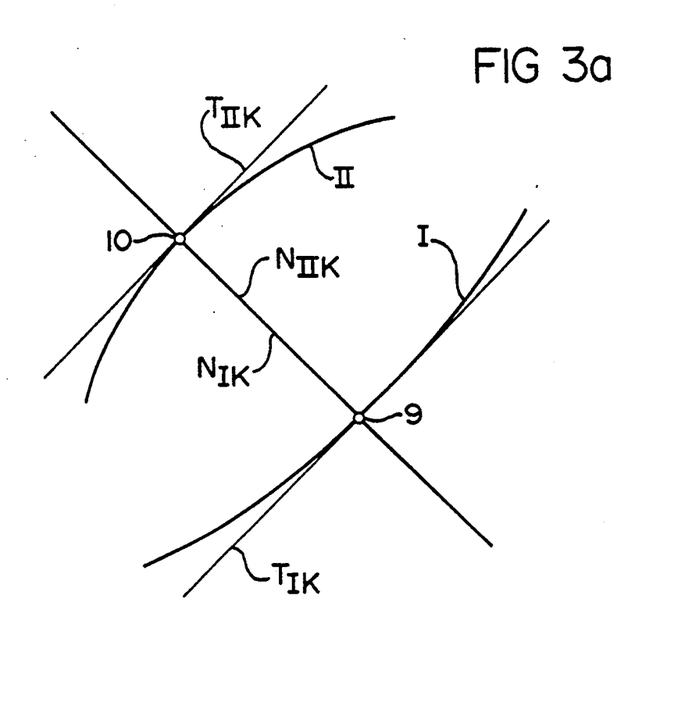
FIG. 3 schematically shows the roll-on curves disposed on the levers, with quantities for the calculation of the roll-on curves being entered thereon.
Figure 3B:
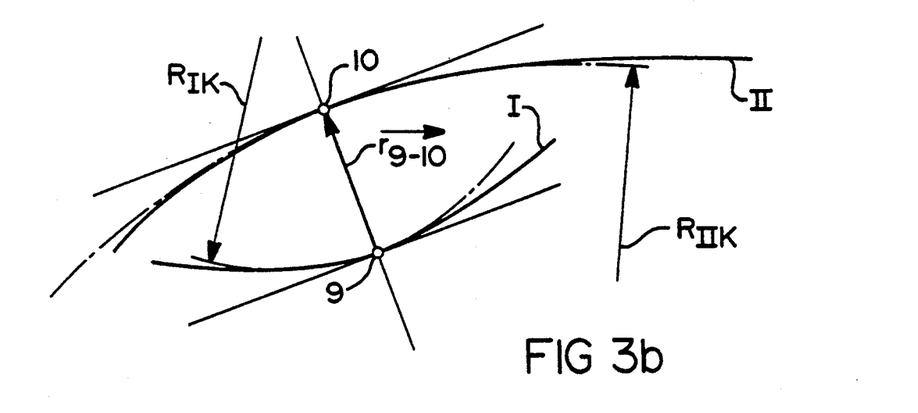

In the example of FIG. 3b, the roll-on curve I, at the point of contact 9, has the radius of curvature $R_{Ik}$, while the radius of curvature of the roll-on curve II at the point of contact 10 amounts to $R_{IIk}$. The respective centers of curvature are located on a straight line extending in the direction of the space $\vec{r}_{9-10}$ of the points of contact.

Figure 4:
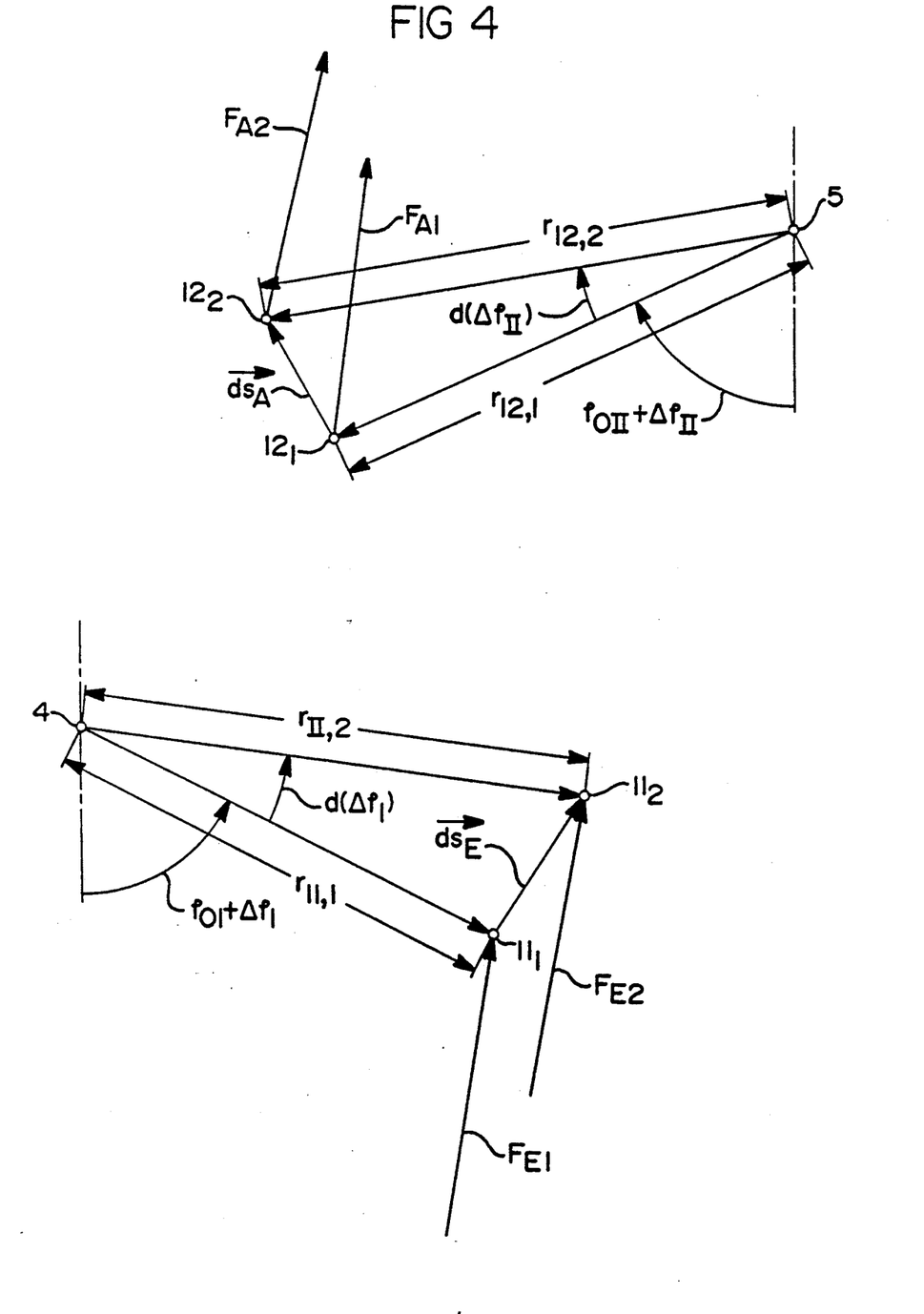
FIG. 4 shows different positions of the levers and of forces acting thereon and is illustrated as a vector diagram.

With reference to FIGS. 1 and 4, the kinematics of the lever gear as shown in FIG. 1 will now be described in greater detail. Once the push rod 7 applies an input force $F_E$ to the lever 1 in the rod direction, the lever 2 forces the push rod 8 upwardly with an output force $F_A$ in the direction of the rod 8, with levers 1 and 2 applying opposite force $F_K$ and $-F_K$ of equal amounts to the rolling element 6 at the points of contact 9 and 10. The direction of the forces at the points of contact 9 and 10 is normal to the curve paths I and II. If lever 1 swivels at a small angle in counter-clockwise direction, the point of force application 11 of the push rod 7 is shifted by a travel section $\vec{ds}_E$, at the same time, the point of contact 9 travels along the travel section $\vec{ds}_9$. The aforementioned swivel movement of the lever 1 causes a swivel movement of the lever 2 in clockwise direction, with the point of force application 12 of the push rod 8 travelling along the travel section $\vec{ds}_A$ while the point of contact passes through the travel section $\vec{ds}_{10}$.

FIG. 4 shows the lever movements in the form of vector diagrams. Once the lever 1 pivots about its axis 4, the point of force application 11 is shifted from a position $11_1$ to a position $11_2$ by a short travel section $ds_E$. In the former-mentioned position $11_1$ point 11 is at a space $r_{11,1}$, from the lever axis 4, while, in the latter-mentioned position $11_2$, it is at a space $r_{11,2}$, with the space vector $r_{11,1}$, in a reference direction $\phi_{OI}$, forming an angle $\Delta\phi_I$. The space vectors $r_{11,1}$ and $r_{11,2}$ enclose an angle of rotation d ($\Delta\phi_I$). Rod 7 applies to lever 1 an input force $F_{E1}$ at point $11_1$, applying, at point $11_2$, a different input force $F_{E2}$ thereto. Once the lever 2 slightly pivots about its swivel axis 5 in clockwise direction, the force application point 12 travels from a position $12_1$ to a position $12_2$, covering a short travel section $ds_A$. Point $12_1$ is at a therefrom. The space vector $r_{12,2}$ with a reference direction $\phi_{OII}$ forms an angle $\Delta\phi_{II}$. The space vector $r_{12,1}$ and $r_{12,2}$ form a small angle d ($\Delta\phi_{II}$). At point $12_1$, an output force $F_{A1}$ is applied to the push rod 8 in the rod direction whereas, at point $12_2$, the corresponding rod force $F_{A2}$ prevails. As the roller element 6 markedly changes its position relative to the axes 4 and 5 of levers 1 and 2 during movement thereof, the transmission ratio of the gear equally changes. Moreover, the transmission ratio is additionally influenced—although to a lesser degree—in that rods 7 and 8, during movement of levers 1 and 2, are changing their direction.

Figure 5:
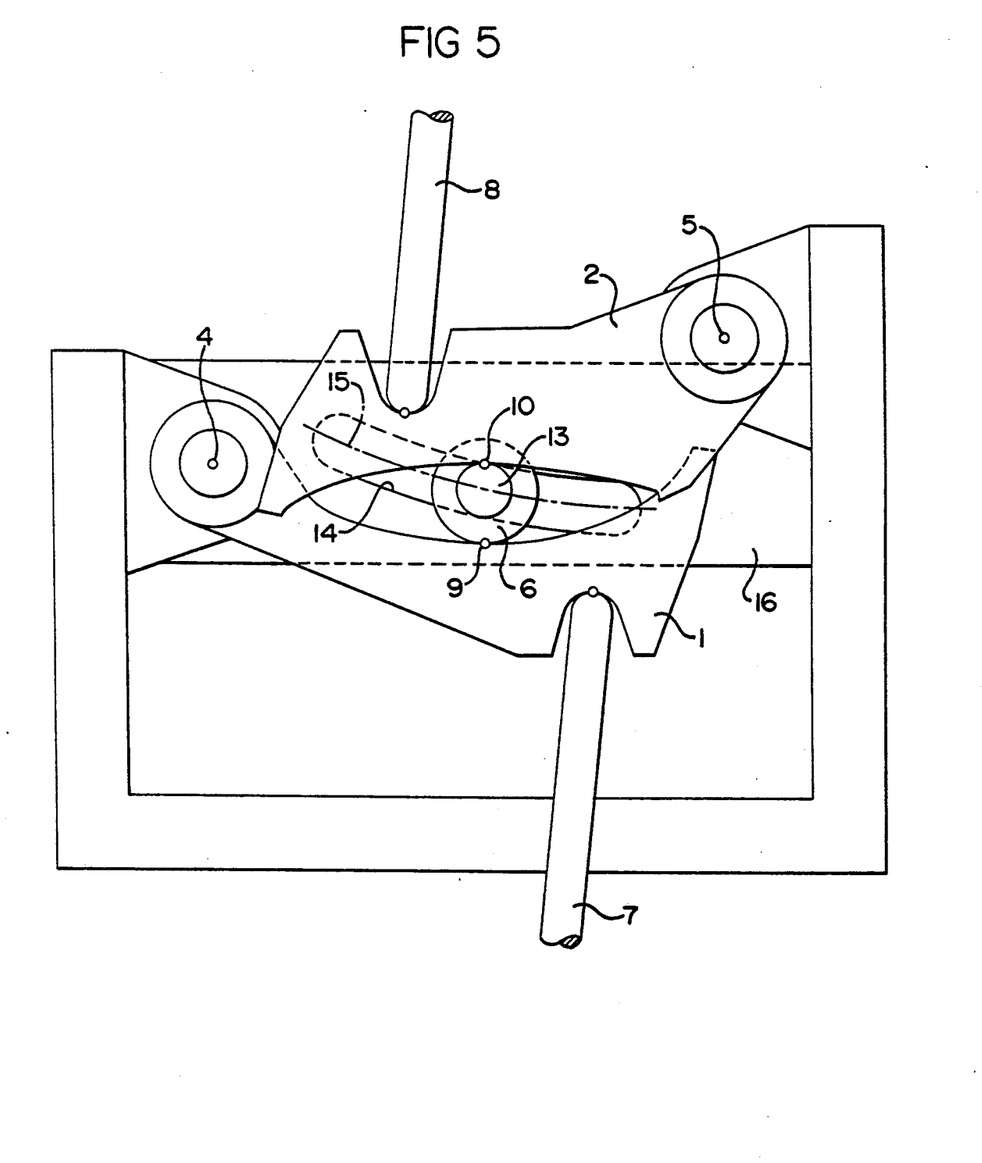
FIG. 5 is a view of an embodiment corresponding to the embodiment of FIG. 1 and provided with a coulisse-type guide.

The form of embodiment as shown in FIG. 5 differs from the one of FIG. 1 only in that the roller element 6, with lateral axle journals 13, is guided in coulisse-type form. For this purpose, grooves 14 are provided in wall portions 16 located, preferably, on either side of the levers 1 and 2 on the gear frame. These grooves accommodate the afore-mentioned axle journals 13 thereby causing the roller element 6 to move with the axis thereof only along a path 15. The path 15 predetermined by coulisse-type guidance, is identical with the path of movement through which roller element 6 also rolls in the gear as shown in FIG. 1, assuming proper function of the gear. The coulisse-type guidance, hence, does not serve in the first place to influence the path of movement of the roller element 6. The guidance is rather intended to thereby increase the operating safety against malfunction by precluding the roller element 6 from leaving its predetermined path.

Figure 6:
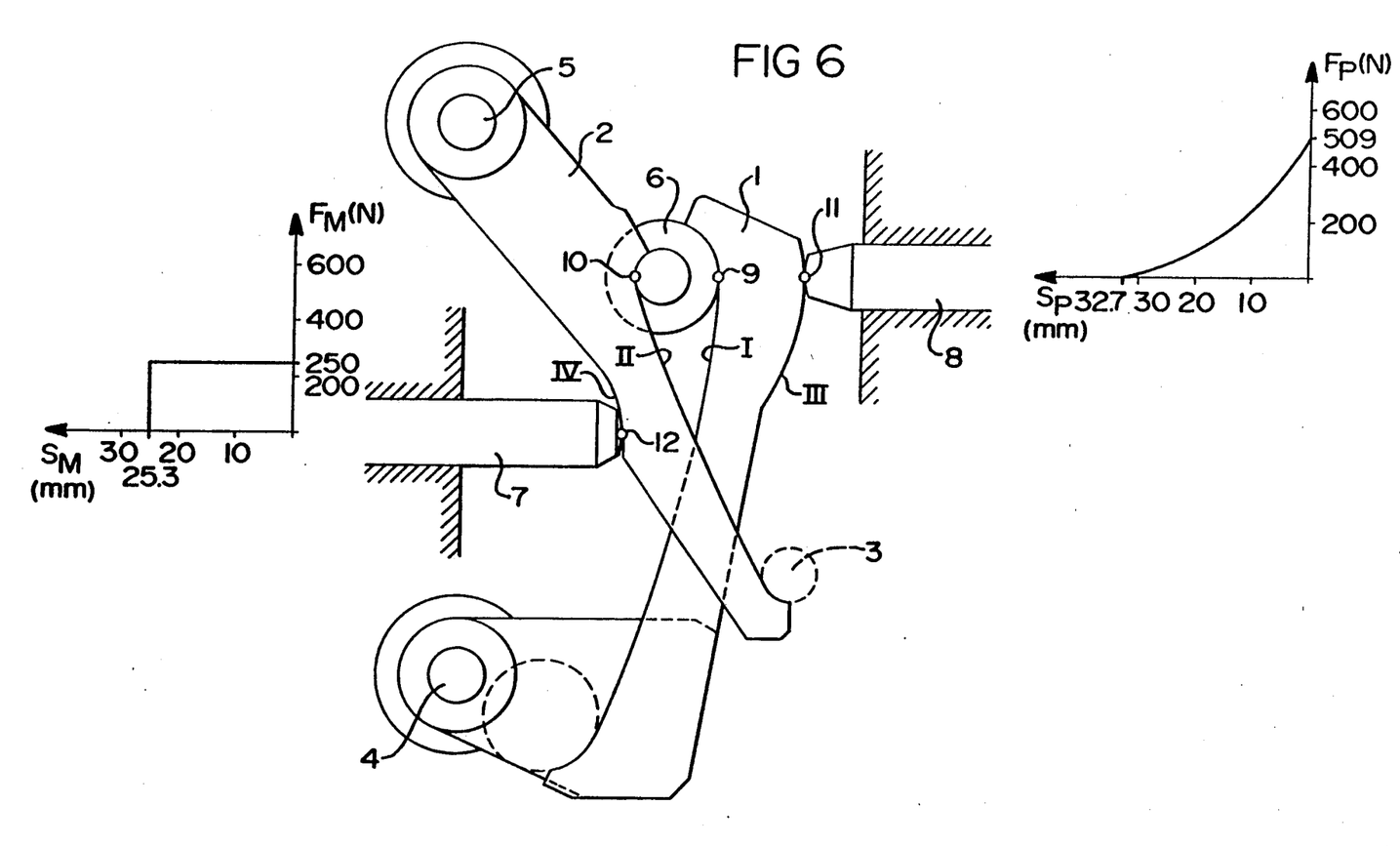
FIG. 6 shows another modified embodiment.
Figure 7:
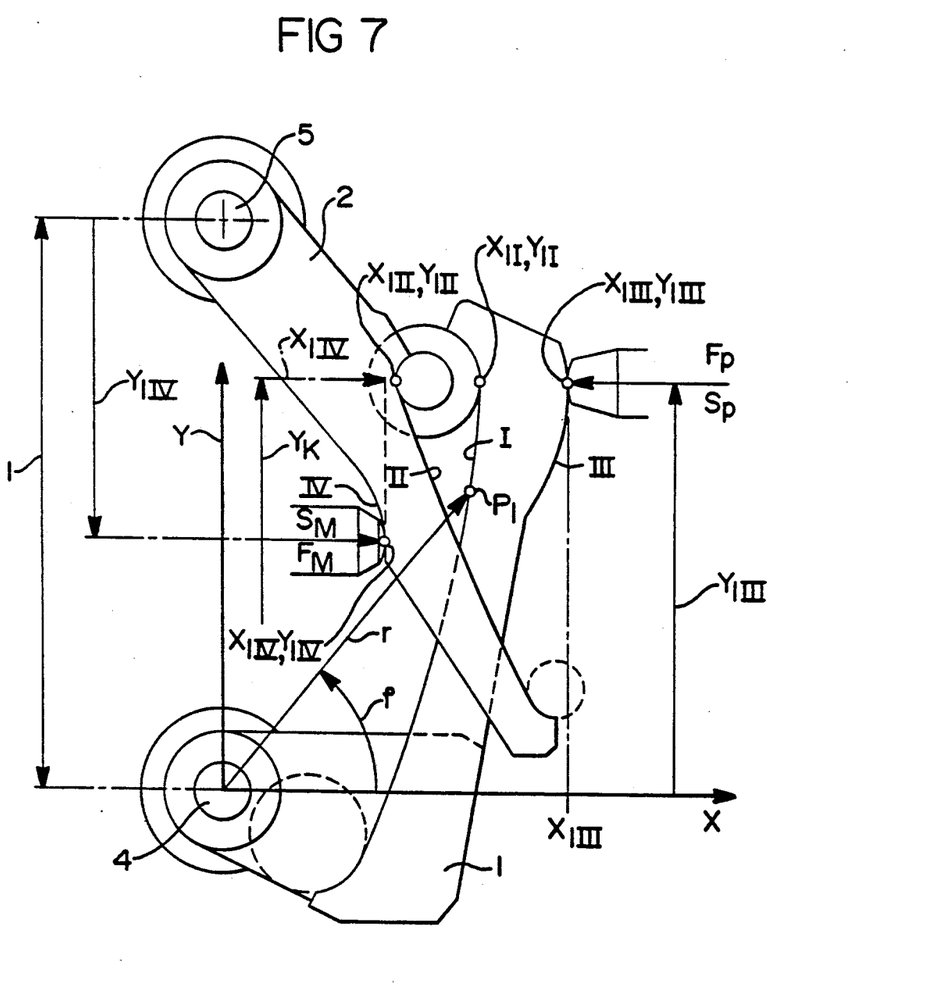
FIG. 7 shows the embodiment of FIG. 6, with spaces and vectorial quantities used in the calculation of the added levers.

The form of embodiment as shown in FIGS. 6 and 7 is distinguished from the afore-described forms of embodiment in that the push rods 7 and 8, in the form of plungers, are longitudinally displaceable and are only capable to perform movement with no change in direction of the rod axis. Moreover, the push rod 7 and 8 with the lever-sided ends thereof are located on outer curve paths III and IV on the sides of levers 1 and 2 respectively facing away from the roll-on curves I and II, with the force application points 11 and 12 of the push rods 7 and 8, during the stroke, travelling along the curve paths III and IV. To reduce friction between the push rods 7 and 8 and the curve paths II and IV, rollers or the like may be provided on the lever-sided ends of the push rods 7 and 8.

To further reduce friction of the gear, the push rods 7 and 8 are provided with rod axes extending in parallel to one another. Moreover, the curve paths III and IV are so formed that the axes of the push rods 7 and 8, on the force application points 11 and 12, respectively, are each perpendicular to the curve path III and IV, respectively. Finally, the roll-on curves I and II are so formed that the normals of the roll-on curves I and II falling one into the other, at the points of contact 9 and 10, between the roll-on curves I and II and the roller element 6, are aligned in parallel to the axes of the rods 7 and 8 and are normal to a plane containing the lever axes 4 and 5.

Plotted by way of example, in FIG. 6 the driving and driven forces $F_P$ and $F_M$ in response to the stroke $s_P$ and $s_M$ such that the lever-type gear as shown permanently is in a state of indifferent equilibrium. As shown, the rod 7, irrespective of its stroke $s_M$, may be loaded by a constant force of 250N against the lever 2 and the outer curve path IV, respectively. In the end position as shown in FIG. 6, wherein lever 2 is in abutment with stop 3, a force of 509N will have to be applied to rod 8 against lever 1 and curve path III, respectively, if a state of indifferent equilibrium is desired. Once the lever gear is so adjusted that rods 7 and 8 loaded against the curve paths III and IV, respectively, in FIG. 6 are displaced to the left, the state of indifferent equilibrium will be maintained if the driving force $F_P$ forcing the rod 8 against the lever 1 exponentially decreases with the stroke $s_P$ as performed while the force $F_M$ applied to the rod 7 can invariably remain constant. With an adequately large stroke of rod 8 it will be sufficient to apply a minimal force $F_P$ to rod 8 to maintain the lever gear in a condition of indifferent equilibrium by way of the constant force $F_M$ applied to the rod 7.

By changing the shape of the roll-on curves I and II and of the curve paths III and IV, respectively, quantitatively different ratios are attainable. However, in any case it will be possible for the gear to be maintained in a state of indifferent equilibrium by applying a constant force to the rod 7 in a manner independent of the stroke, while a force increasing and decreasing in response to the stroke direction acts upon the rod 8.

As set forth in the following, the gear in accordance with the present invention, therefore, is particularly suitable for use with brake modulators where fluid forces acting on a plunger can be held in balance by a constant force of actuation provided by an actuator.

Figure 8:
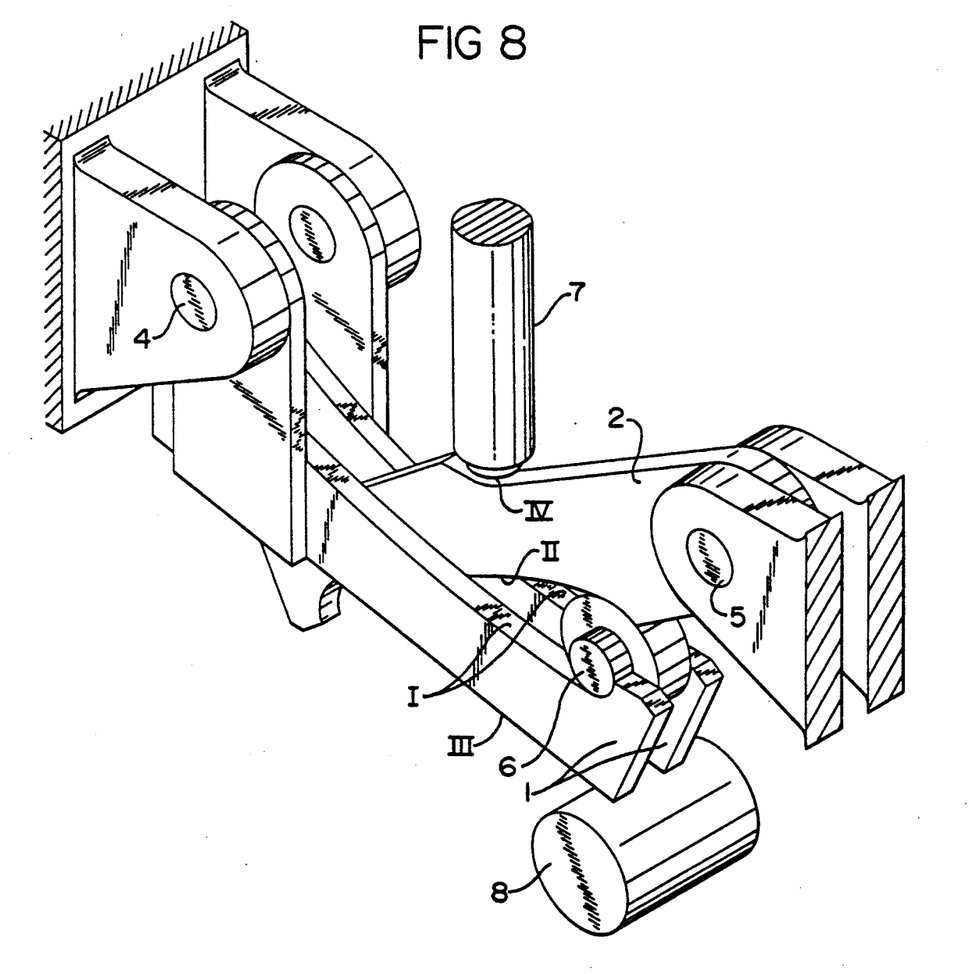
FIG. 8 is a perspective view of the embodiment as shown in FIGS. 6 and 7.

FIG. 8 is a perspective view of the gear as shown in FIGS. 6 and 7, with the push rod 8 being only shown by the roller located at the lever-sided end of the push rod 8. Lever 1 comprises two fork-type interconnected lever parts between which is provided an adequate free space for the lever 2. The roller element 6 comprises two front-sided rollers of smaller diameter running on the roll-on curves I of the lever parts of lever 1, whereas one roller of larger diameter cooperates with the roll-on curve II of lever 2. Incidentally, the roller of larger diameter is guided between the parts of lever 1 in flange-type form so that the roller element 6 is axially blocked.

Figure 10A:
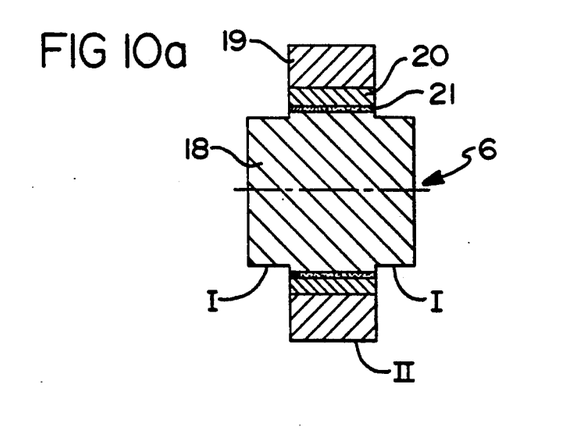
FIGS. 10a, 10b, and 10c illustrate various embodiments of the roller element.
Figure 10B:
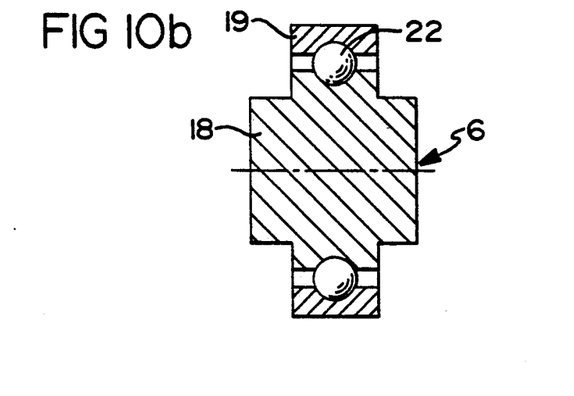
Figure 10C:
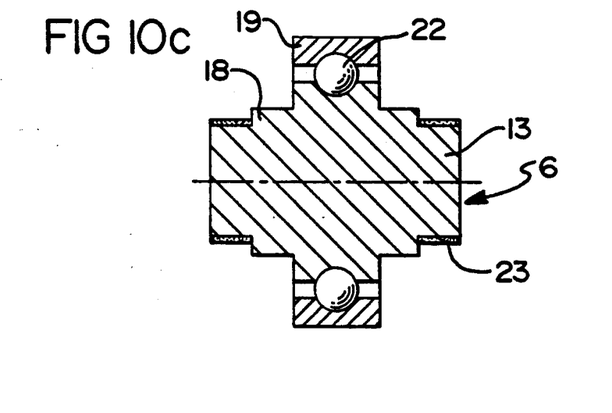

FIGS. 10(a), 10(b), and 10(c) show axial sections of a variety of forms of embodiment of the roller element 6. According to FIG. 10a, the roller element 6 comprises an internal element 18 the two front ends of which form two rollers of smaller diameter which, in the example of FIG. 8 run on the path sections of roll-on curve I of lever 1. Between the front ends, the internal member 18 comprises a slightly concentrated central area coated with a lubricant layer 21. Pivotably disposed on the lubricant layer 21 is a slide bearing 20 of an outer ring 19 which, in the example of FIG. 8, forms the larger-sized diameter roller running on the roller curve II of lever 2. Based on the arrangement as shown the rollers of smaller and larger diameters can rotate relative to one another without any notable friction. Accordingly, in the example of FIG. 8, the smaller-diameter rollers, upon displacement of the roller element 6 toward the lever axis 4, will roll along the roll-on curve I while rotating in counter clockwise direction whereas the larger-diameter roller, at the same time, rolls along the roll-on curve II while rotating in clockwise direction. The embodiment according to FIG. 10b is distinguished from the one according to FIG. 10a in that a ball bearing 22 is located between the outer ring 19 and the internal member 18. The form of embodiment according to 10c is provided with tapering extensions 13 coated with a lubricant layer 23 and located on the front ends of the internal element 18. These extensions 13 enable the roller element 6 to be guided in a groove 14 provided as coulisse, see FIG. 5.

Figure 9:
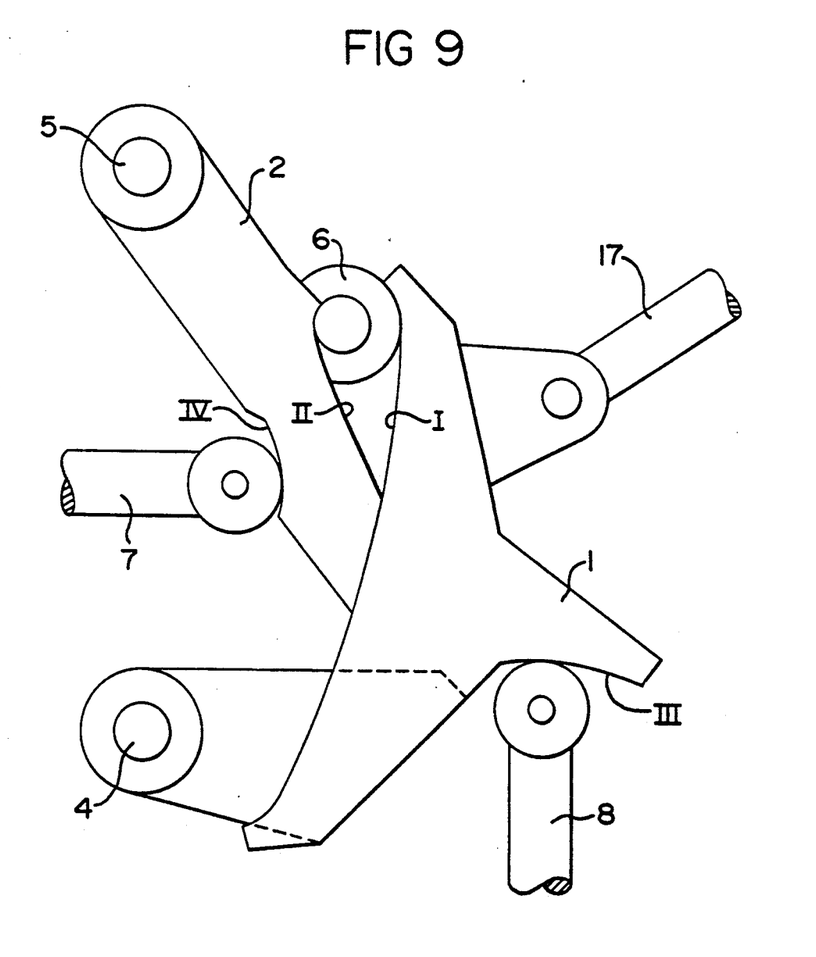
FIG. 9 illustrates another modified embodiment.

FIG. 9 shows a lever-type transmission gear modified over FIGS. 6 and 7, wherein the one push rod 8 is longitudinally displaceable in parallel to a plane containing the lever axes 4 and 5 and cooperates with the curve path III located substantially transverse to the roller curve I. The function of the gear, basically, is not changed thereby. In this embodiment it is, again, possible to hold a constant force applied to rod 7 in indifferent balance with a force dependent on the position of rod 8. Based on the altered arrangement of the rod 8, the coupling of the gear to other elements can be simplified and, if need be, of a more compact configuration. However, generally a friction slightly higher than in the embodiments of FIGS. 6 and 7 will have to be accepted. FIG. 9, in addition, shows a lever adjusting mechanism 17 to which an additional force can be applied to adjust the lever-type gear in a variety of positions once the gear, incidentally, is in an indifferent equilibrium on the basis of the forces applied to the rods 7 and 8.

Figure 11:
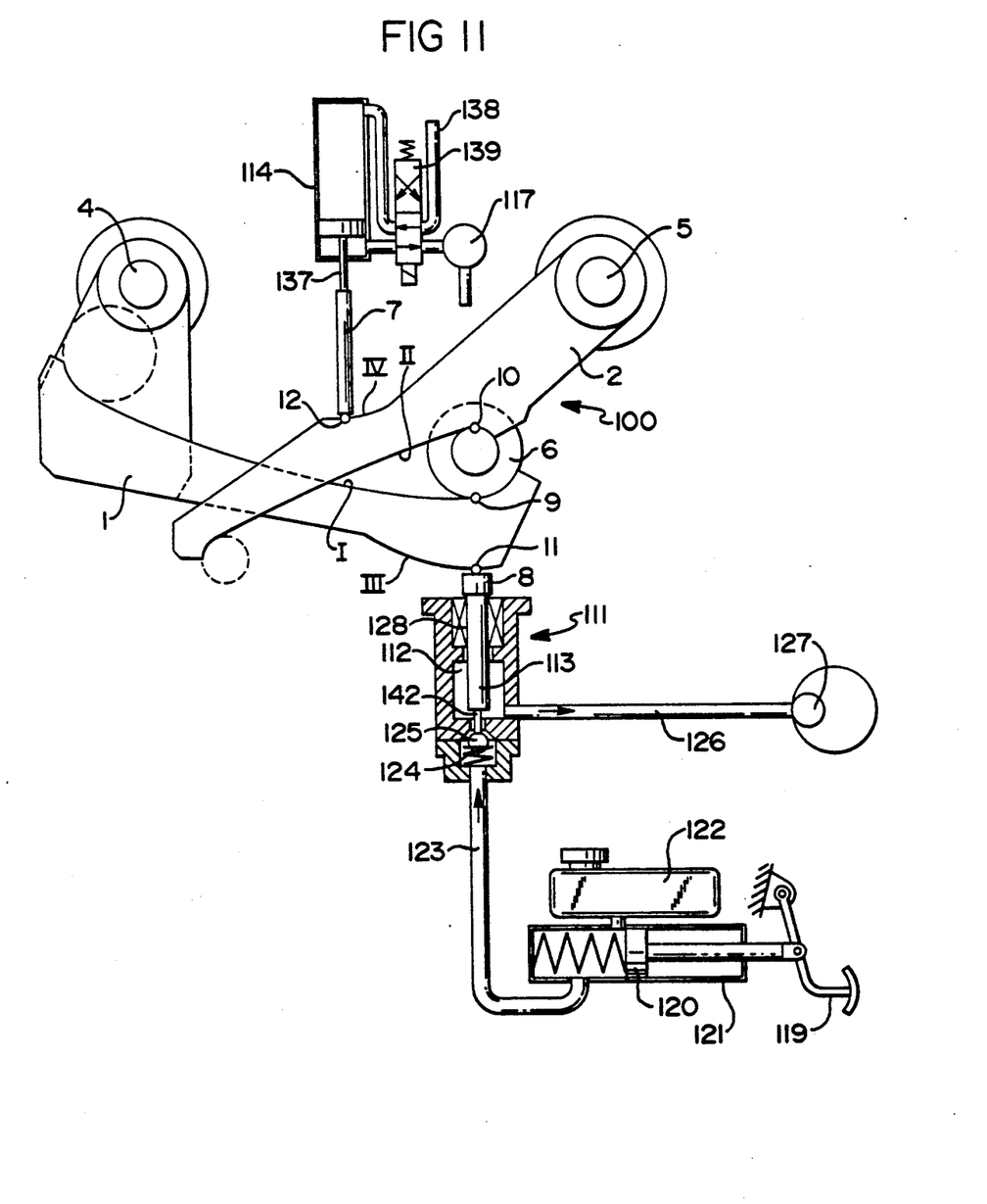
FIG. 11 illustrates an example for the arrangement of the lever gear in accordance with the present invention as part of a brake force modulator.

FIG. 11, by way of example, shows the lever-type transmission gear of the invention as used in a brake pressure modulator. According to the drawing, a brake pedal 119 applies pressure to the piston 120 of a master cylinder 121 to which hydraulic fluid from an intake reservoir 122 is supplied. From the pressure chamber of the master cylinder 121, a hydraulic conduit 123 leads to the inlet of a volume receiving unit 111 comprising a cylindrical chamber 112 which, on the one hand, through a ball valve 125 to which pressure is applied by a spring 124, is in communication with the hydraulic conduit 123 and, through an additional hydraulic conduit 126 laterally branching off, is in communication with a wheel brake cylinder 127 only schematically shown. The conduit also could lead to two or more wheel brake cylinders. Disposed in the cylindrical chamber 112 is a circular-cylinder-shaped plunger 113 which, through guide port 128, is tightly guided outwardly, which is disposed axially opposite the ball-type valve 125. Externally of the volume receiving unit 111, the plunger is coaxially connected to the rod 8 of the lever-type gear of the invention generally designated by 100. The hydraulic pressure in the cylindrical chamber 112, hence, tends to force the plunger 113 by rod 8 against lever 1 of gear 100. The rod 7 cooperating with the lever 2 of the gear 100 is connected to a plunger 137 of a piston-cylinder arrangement 114 which, through a change-over valve 139, is in communication with an atmospheric pressure connection 138 and a vacuum source 117.

The way of operation of the brake pressure modulator substantially is as follows. In normal decelerating operation, with no brake skid occurring, the volume receiving unit 111 takes the resting position as shown in the drawing, in which the ball-type valve 125, through its actuating ram 142 only in abutting relationship with the plunger 113, is opened. The change-over valve 139 is in the position as shown such that the plunger 137 and the rod 7 are forced against the lever 2 of the gear 100. In the event of a panic deceleration, the pressure in the cylinder chamber 112 will considerably rise on account of the correspondingly heavy actuation of the brake pedal 119 such that at least an approximately indifferent state of equilibrium of the gear 100 is attained, i.e., the lever-type gear 100 can be adjusted by extremely negligible additional forces of a control means (not shown) to reduce, if need be, the pressure on a wheel brake cylinder 127 of a locking wheel. In an adjustment of this type, plunger 113, in FIG. 3, is displaced upwardly, with the ball-type valve 125 closing. Accordingly, the pressure in the cylindrical chamber 112, in a further upward displacement of the plunger 113, will have to decrease as during this displacement the volume of the hydraulic chamber blocked above the valve 125 is increased.

In standard-type brakes, the pressure in the cylindrical chamber 112 changes on account of the volume elasticity of the hydraulic medium and the elasticity of the walls of the hydraulic conduits and the like approximately exponentially with the stroke of the plunger 113 and the rod 8 coupled thereto, respectively. The pressure in the cylindrical chamber 112, hence, will decrease exponentially in accordance with the stroke of the plunger 113 directed upwardly in FIG. 11, and the rod 8 coupled thereto. With the lever-type gear 100 of corresponding design, the same will permanently remain in a state of indifferent equilibrium, i.e., even if the piston/cylinder arrangement 114 permanently applies a constant pressure difference to the piston thereby causing the rod 7 irrespective of the stroke thereof to be loaded by a constant force against the lever 2 of the gear, the forces of rods 7 and 8 will be offset. Consequently, the plunger 113, by applying negligible additional forces for modulation of the pressure on the wheel brake cylinder 127, can be reciprocated.

The additional force or part thereof, respectively, generally must be applied to lever 1 once the gear according to the diagrams of forces $F_p$ and $F_M$ in FIG. 6 can occupy a position in which a fading force on lever 1, that is, $F_p=0$, is in a state of equilibrium with the force $F_M>0$ on lever 2. In that position, the gear automatically is blocked if actuated only from lever 2, i.e., an additional force exclusively acting on the lever 2 will not be capable to adjust the gear. Externally of this automatically blocking area, the additional force can, for example, be solely generated in that the change-over valve 139 is temporarily reversed to change the pressure difference acting on the piston of the piston cylinder aggregate 114 to an extent adequately low for the adjustment of the gear. A control of the plunger movements of this type by applying an additional force to the lever 2 will be adequate once the gear is designed such that the automatically blocking area cannot be reached. For example, stops (not shown) may be provided that cooperate with the levers 1 and 2, permitting only movements externally of the automatically blocking area.

In the arrangement as shown, use is made of the fact that, with a view to the actuating work, a brake system acts as an energy accumulator, i.e., the work required for a pressure increase in the system largely is stored as a flexible load and can be used reversibly. Moreover, it is of advantage that despite the exponentially variable forces acting on the plunger 113, a substantially non-regulated vacuum source with associated piston/cylinder aggregate, i.e., a constant force source, will be adequate to establish an indifferent condition of equilibrium and to actuate the plunger 113 by extremely low forces which substantially only will have to overcome the internal friction of the system as a whole.

A special advantage of the system as shown in FIG. 11, on the one hand, is that the additional forces required for adjustment of the plunger 113 are extremely low and, moreover, the gear 100 can be designed such that the plunger forces can be compensated also by a very weak actuator which, in the example as shown, is the piston/cylinder arrangement 114, without any appreciable efforts of regulation. This will take into account the emerging development that, in the future, only relatively little energy for servo systems need be tapped from the vehicle engine as compared with the overall engine performance.

In the following, essential features of the lever-type gear according to the invention are shown in mathematicized form. Concerning the qualities used therein, reference is made to FIGS. 1, 3, 6 and 7. The geometry of the roller curves I and II is determined by the following conditions:

In any position of levers 1 and 2, both roll-on curves I and II, in points of contact 9 and 10, have a common normal (see FIG. 3a):

$$N_{Ik}=N_{IIk} \tag{1}$$

The curvatures of the two roll-on curves I and II, in the points of contact 9 and 10, have inverse signs:

$$\text{sgn } R_I = -\text{sgn } R_{II} \tag{2}$$

and are concave, viewed from the roller element 6 (see FIG. 3b).

The space of the contact point 9 and 10 irrespective of the lever positions, is constant (see FIG. 2b):

$$(\vec{r}_{9-10})^2 = \text{const.} \tag{3}$$

In equation (3), the vectorial spelling has been selected to clarify that only the amount of the space rather than the direction of the space vector $\vec{r}_{9-10}$ remains invariable constant.

Moreover, the lever-type gear must be sufficient for the rate of energy obtained.

If the actuating work of a brake system, of a brake circuit or of an individual element thereof (plunger 113) is $E_B$ and if a part or a multiple $\alpha$ thereof is to be rendered reversibly useful, then the following equation applies to the driving or input side of the lever-type gear facing away from the brake system (see FIG. 3):

$$E=\alpha E_B \tag{4}$$

with $$E_B=p \cdot dV \tag{5}$$

wherein $$p=f_1(V)=f_2(\vec{s}_E) \tag{6}$$

wherein p is the pressure in the cylindrical chamber 112 of FIG. 11; dV is the differential volume change during movement of the plunger 113, and $f_1$ and $f_2$, respectively, are functional dependencies predetermined by the construction of the brake system, between p and V and between p and the stroke $s_E$ of the plunger 113 and the rod 8, respectively.

The mechanical work on the driving and input side, respectively, alternatively, can be expressed by:

$$dE_E=\vec{F}_E \cdot \vec{ds}_E \tag{7}$$

$$E_E=\int \vec{F}_E \cdot \vec{ds}_E \tag{8}$$

On the driven and output side, respectively, of the gear lever, the following applies, in analogy (see FIG. 1):

$$dE_A=\vec{F}_A \cdot \vec{ds}_A \tag{9}$$

$$E_A=\int \vec{F}_A \cdot \vec{ds}_A \tag{10}$$

wherein $E_A$, at the same time, represents the energy fed to and stored in the brake system. Here, too, the following applies in general:

$$\vec{F}_A=f_3(\vec{s}_A) \tag{11}$$

i.e., force $\vec{F}_A$ in accordance with a functional correlation $f_3$ is dependent on the stroke $s_A$ of rod 8.

If the friction is substantially negligible, the following equation applies to the difference E between the work performed on the input side and the work performed on the output side of the lever-type gear:

$$\Delta E=E_E-E_A=0 \tag{12}$$

from which it can be directly concluded $$dE_E = dE_A \tag{13}$$

Based on equations (7) and (9), the following applies:

$$\vec{F}_E \cdot \vec{ds}_E = \vec{F}_A \cdot \vec{ds}_A \tag{14}$$

The angle-of-rotation differentials d ($\Delta\phi_I$) and d ($\Delta\phi_{II}$), respectively, of levers 1 and 2 (see FIG. 4) correspond to the travel sections $\vec{ds}_E$ and $\vec{ds}_A$ in FIGS. 1 and 4.

Equation (11) describes the work characteristic of the brake system or an element (plunger 113) thereof acting as an energy accumulator. Roll-on curves I and II can be clearly determined from the position of the lever axes 4 and 5 and from the kinematics of rods 7 and 8 and the transmission element provided in lieu thereof, respectively, under consideration of the above-identified equations.

Compliance with equations (1) and (2) will insure that the roller element (6), in any position of levers 1 and 2, holds a stable position. Accordingly, it will automatically move also during any lever movement toward a new stable position, with trouble-free operation of the gear, even if provision of a coulisse as in FIG. 5 is abstained from.

Equation (3) emanates from equation (4):

If the input and output energies are to be identical on the lever-type gear of the invention, as conveyed by equation (12), then the following correlation must exist between roller element 6 and roll-on curves I and II in points of contact 9 and 10 (see FIG. 1):

$$\vec{F}_K \cdot \vec{ds}_{10} + (\vec{F}_K) \cdot \vec{ds}_9 = 0$$

This corresponds to the applicability of the following formula:

$$\vec{ds}_9 \cdot \vec{i}_k = \vec{ds}_{10} \cdot \vec{i}_k \tag{15}$$

wherein I is a unit vector toward force $F_K$.

Accordingly, the following applies:

$$(\vec{r}_{9-10})^2 = \text{const.} \tag{3}$$

Hence, it is ensured that an element having invariably equidistant lines of contact, i.e., with line contact at the points of contact 9 and 10, may be provided between levers 1 and 2 as a force transmission element.

In the lever-type gears as shown in depicts 6 and 7, additional provision has been made so that:

(i) all internal and external forces, in all positions of levers 1 and 2, are located on parallel lines of operation;

(ii) the outer forces on the driving and driven sides in all lever positions comprise the same line of operation; and, (iii) the transmission of the translatory movement of the outer forces (or of rods 7 and 8, respectively) to levers 1 and 2 is effected through outer roll-on curves III and IV.

Applicable to all roll-on curves and curve paths I to IV, respectively, in this instance, is the differential equation relating to the respective lever axis 4 and 5, in polar coordinates $$\frac{dr}{d\phi} = r \cdot \tan(\phi + \Delta\phi) \tag{16}$$

with $\Delta\phi$ representing the angle of rotation of the respective lever 1 or 2 under load in relation to a position of reference, e.g., an initial position.

The solution of the differential equation (16) can be indicated for the curve paths III and IV in closed form:

$$\phi = \arcsin\frac{y_1}{r} - \frac{1}{y_1}(x_1 - \sqrt{r^2 - y_1^2}) \tag{17}$$

with the respective Cartesian coordinates $x_{1III}$, $y_{1III}$ and $x_{1IV}$, $y_{1IV}$ of the force application points 11 and 12 of rods 7 and 8 being placed onto the curve paths III and IV for $x_1$ and $y_1$. These curve paths are in the form of circular involutes. Accordingly, the following simple correlation exists between the stroke s of rods 7 and 8, respectively, and the angle of rotation of the respectively associated lever 1 and 2, respectively:

$$\Delta\phi = \frac{s}{y_1} \tag{18}$$

When determining the shape of the roll-on curves I and II—unlike as in curve paths III and IV where the value of $y_1$ (and $y_{1III}$ and $Y_{1IV}$, respectively) remains unchanged for all positions of levers 1 and 2—the ordinate $y_k$ of the points of contact 9 and 10, between roller element 6 and roller paths I and II, is a function of the external forces:

$$y_K = \frac{1}{1 + \frac{y_{1II}}{y_{1I}} \cdot \frac{F_M}{F_p}} \tag{19}$$

Moreover, the functional correlations between the forces $F_P$ and $F_p$ and $F_M$, respectively, and strokes $s_p$ and $S_M$, respectively (see FIG. 7), will have to be taken into consideration, i.e., equations $$F_p = f(s_p) \tag{20}$$

$$F_M = f(s_M) \tag{21}$$

A solution of the differential equation (16), as a rule, will be possible only by numerical integration for predetermined initial conditions. The shaping of roll-on curves I and II as shown in FIGS. 6 and 7 is result of such a calculation based on the force/way-characteristics as graphically shown in FIG. 6.

The sectioned fields below the respective curves, in accordance with equation (12) must be of identical areas (see FIG. 6).

Moreover, it is pointed out that an additional force serving to adjust the lever-type gear being in a condition of indifferent equilibrium should act on lever 1 in FIG. 6 and FIG. 11, respectively, because lever 2 is self-locking vis-a-vis lever 1 once lever 1 is in a position associated to stroke $s_{max}$ of rod 8 according to FIG. 6, and a fading force, i.e., $F_p = 0$, is applied thereto by rod 8. Optionally, the lever-type gear can be located such that rod 8 can only perform a stroke lower than $s_{max}$ and lever 1 equally is prevented from performing an extended pivot movement.

In the exemplary of embodiments shown in the drawing, the forces loading levers 1 and 2 against the roller element 6 are transmitted to levers 1 and 2, respectively, by means of rods 8 and 7. However, it is also possible to provide, for transmission of the said forces, tension members or the like on levers 1 and 2, respectively. For example, ears can be provided on levers 1 or 2 which, in turn, are respectively in communication with a tension spring for the transmission of tension forces to the respective lever. Moreover, the description of the present invention with reference to the drawing is directed to certain embodiments wherein within the range of movement of the gear, irrespective of the lever position, a force exponentially changing with the stroke of the one gear side can be held by a constant force on the other side of the gear side in a state of indifferent equilibrium. Alternatively, the roll-on curves and roller paths, respectively, can be so shaped that also a force changing in a manner other than exponential can be held in equilibrium by a constant force.

Further, the lever-type gear of the invention is not restricted to cases of end-use application wherein a lever, by a constant force, is loaded against the roller element. It is, for example, also possible to apply a force to lever 2 as shown in FIG. 6, through the rod 7 and another element working under pressure or tension, respectively, which force, upon a pivot movement of the lever 2 to the left in clockwise direction will rise in a direction approximately linear as is customary with increasingly loaded springs. Alternatively, it is also possible that the force decreases with an increasing swivel stroke of the lever 2 to the left. In the event that the gear, in all positions, respectively is to assume at least an approximate state of equilibrium, the force loading the lever 1 against the roller element 6 accordingly will change in correspondingly modified form in response to the position of lever 1.

What is claimed is:

1. A lever-type transmission gear, comprising a pair of coupled levers pivotable about spaced-apart axes approximately in parallel, and exhibiting a variable transmission ratio dependent on the position of the pair of levers, between a driving and a driven side of the gear, wherein the two levers apply force to one another by means of a roller element disposed therebetween, with said roller element rolling on internal roll-on curves facing one another, along the flanks of the two levers, and wherein the roll-on curves, in the direction of the oppositely facing lever flank, respectively exhibit a concave curvature so that the roller element, with levers loaded relative to one another, tends to occupy a stable position and wherein the position of the roller element varies automatically when the levers pivot.

2. The lever-type transmission gear according to claim 1, wherein the roll-on curves, in the points of contact of the roller element composed of one or more coaxial rollers in the direction of the lever pivot axes comprise a common normal.

3. A lever-type transmission gear, comprising a pair of coupled levers pivotable about spaced-apart axes approximately in parallel, and exhibiting a variable transmission ratio dependent on the position of the pair of levers, between a driving and a driven side of the gear, wherein the two levers apply force to one another by means of a roller element disposed therebetween, with said roller element rolling on internal roll-on curves facing one another, along the flanks of the two levers, and wherein the roll-on curves, in the direction of the oppositely facing lever flank, respectively exhibit a concave curvature so that the roller element, with levers loaded relative to one another, tends to occupy a stable position, and, wherein the roller element is guided in a coulisse stationary relative to the pivot axes of the levers.

4. The lever-type transmission gear according to claim 3, wherein the roller element, at least on one end of the roller axis thereof, is guided, by means of an extension, in a groove provided in the form of a coulisse.

5. A lever-type transmission gear, comprising a pair of coupled levers pivotable about spaced-apart axes approximately in parallel, and exhibiting a variable transmission ratio dependent on the position of the pair of levers, between a driving and a driven side of the gear, wherein the two levers apply force to one another by means of a roller element disposed therebetween, with said roller element rolling on internal roll-on curves facing one another, along the flanks of the two levers, and wherein the roll-on curves, in the direction of the oppositely facing lever flank, respectively exhibit a concave curvature so that the roller element, with levers loaded relative to one another, tends to occupy a stable position, and, wherein the roller element is formed of two coaxial rollers or roller groups rotatable relative to one another, with the roller or rollers of the one group running on the roll-on curve or roll-on curve paths of the one lever and the roller or rollers of the other group running on the roll-on curve and roll-on curve paths, respectively, of the other lever.

6. The lever-type gear according to claim 5, wherein the rollers of the two groups are of different diameters and that one roller of larger diameter with opposite front face sections between two roll-on curve paths for smaller rollers is axially guided for axially locking the roller element.

7. The lever-type transmission gear according to claim 5, wherein the rollers of the two groups are of different diameters, and that the two larger-diameter rollers, laterally, embrace a roll-on curve path for at least one smaller roller to axially lock and guide the roller element with front sections facing one another.

8. The lever-type transmission gear according to claim 5, wherein disposed on either side of a larger-diameter roller are rollers of smaller diameters to form an internal roller member going through the large roller to carry the same.

9. The lever-type transmission gear according to claim 8, wherein the input and output driving and driven elements of the gear respectively are rods guided in plunger-type and longitudinally displaceable manner, which rods with the lever-sided ends thereof or with rollers provided thereon, respectively, on external curve paths, are in abutment with the sides of levers facing away from the internal roll-on curves.

10. The lever-type transmission gear according to claim 9, wherein the rods are located with axes extending in parallel.

11. The lever-type transmission gear according to claim 10, wherein the parallel rod axes are aligned in parallel with the common normal through the points of contact between the inner roll-on curves and the roller element.

12. The lever-type transmission gear according to claim 10, wherein the outer curve paths are in the form of circular involutes.

13. The lever-type transmission gear according to claim 10, wherein the inner and/or outer roll-on curves and curve paths, respectively, as so shaped that within the range of movability of the gear, irrespective of the lever position, a force exponentially changing with the stroke of the one driving side, by a constant force, on the driven side, can be held in a state of indifferent equilibrium.

14. The lever-type transmission gear according to claim 10, wherein the driving and driven elements, respectively apply force to the associated lever at a space from the pivot axis thereof which exceeds the maximum possible space of the roller element from the pivot axis, and that the lever on the pivot axis, by means of a tool bearing, is supported against the torque generated by the driving and driven element, respectively, relative to the point of contact, between lever and roller element.

15. The lever-type transmission gear according to claim 14, wherein force is applied by a driving or driven element to the associated lever at a space from the pivot axis thereof smaller than the minimum possible space of the roller member from the said pivot axis, and that the lever, on the pivot axis, by means of a tool bearing, is supported against the torque generated by the driving and driven element, relative to the point of contact between lever and roller member.

16. The lever-type transmission gear according to claim 15, wherein the gear within its range of movement, can only occupy such positions in which there is a state of equilibrium between the forces loading the levers against the roller element only if the said forces are of a value other than zero.

17. The lever-type transmission gear according to claim 16, wherein the gear is adjustable in a position wherein a first force loading the one lever against the roller element is in a state of equilibrium with a greater force loading the other lever against the roller element, and wherein at least in said position an additional force can be applied to the one lever for adjustment of the gear.

* * * * *